United States Patent
McFarthing et al.

(10) Patent No.: US 9,361,564 B2
(45) Date of Patent: Jun. 7, 2016

(54) PROTECTION OF AN NFC OR RFID RADIO IN THE PRESENCE OF STRONG ELECTROMAGNETIC FIELDS

(71) Applicant: QUALCOMM TECHNOLOGIES INTERNATIONAL, LTD., Cambridge (GB)

(72) Inventors: Anthony Lawrence McFarthing, Cambridgeshire (GB); Rainer Herberholz, Cambridge (GB); Peter Andrew Rees Williams, Cambridge (GB)

(73) Assignee: Qualcomm Technologies International, Ltd., Cambridge (GB)

( * ) Notice: Subject to any disclaimer, the term of this patent is extended or adjusted under 35 U.S.C. 154(b) by 74 days.

(21) Appl. No.: 14/093,895

(22) Filed: Dec. 2, 2013

(65) Prior Publication Data

US 2015/0154486 A1 Jun. 4, 2015

(51) Int. Cl.
| | |
|---|---|
| G06K 19/06 | (2006.01) |
| G06K 19/07 | (2006.01) |
| H02J 5/00 | (2016.01) |
| H02J 7/02 | (2016.01) |
| H02J 7/00 | (2006.01) |
| H02H 9/04 | (2006.01) |
| G06K 19/073 | (2006.01) |
| H02H 3/02 | (2006.01) |

(52) U.S. Cl.
CPC .......... *G06K 19/0712* (2013.01); *G06K 19/073* (2013.01); *G06K 19/0707* (2013.01); *G06K 19/0715* (2013.01); *H02H 9/04* (2013.01); *H02J 5/005* (2013.01); *H02J 7/0029* (2013.01); *H02J 7/025* (2013.01); *H02J 50/10* (2016.02); *H02H 3/025* (2013.01)

(58) Field of Classification Search
CPC ......... H02H 3/20; H02H 11/00; G06K 19/07; H04B 5/00
See application file for complete search history.

(56) References Cited

U.S. PATENT DOCUMENTS 5,850,181 A 12/1998 Heinrich et al.
8,665,171 B2 * 3/2014 Maruyama .................... 343/853
(Continued)

FOREIGN PATENT DOCUMENTS

EP 1914669 4/2008
EP 2615717 7/2013

OTHER PUBLICATIONS

British Search Report issued Jan. 21, 2015 in corresponding GB 1412694.0.

*Primary Examiner* — Thien M Le
*Assistant Examiner* — Asifa Habib
(74) *Attorney, Agent, or Firm* — Paradice and Li LLP

(57) ABSTRACT

Methods and devices are described, including a near-field communications (NFC) or radio frequency identification (RFID) device comprising an NFC or RFID circuit, an antenna having at least a first terminal, a first rectifier connected to the first terminal of the antenna, a switch between the first rectifier and the NFC or RFID circuit, a voltage detector for detecting a voltage in the device caused by a signal received at the antenna, and a control module for controlling the switch, wherein when the voltage exceeds a threshold magnitude, the control module controls the switch to be in an open state and, after a predetermined time period, determines whether the voltage still exceeds the threshold magnitude and, if the voltage still exceeds the predetermined magnitude, controls the switch to be in the open state.

18 Claims, 3 Drawing Sheets

(56) References Cited

U.S. PATENT DOCUMENTS

| | | |
|---|---|---|
| 2005/0254183 A1 | 11/2005 | Ishida et al. |
| 2007/0090871 A1* | 4/2007 | Kwak et al. .................. 327/536 |
| 2007/0278998 A1 | 12/2007 | Koyama |
| 2008/0079396 A1 | 4/2008 | Yamazaki et al. |
| 2010/0079921 A1 | 4/2010 | Fujita |
| 2013/0099585 A1 | 4/2013 | Von Novak et al. |
| 2013/0242445 A1* | 9/2013 | Dani ..................... H02H 3/207 361/86 |
| 2014/0152114 A1* | 6/2014 | Kim et al. .................... 307/104 |

* cited by examiner

300

PROTECTION OF AN NFC OR RFID RADIO IN THE PRESENCE OF STRONG ELECTROMAGNETIC FIELDS

TECHNICAL FIELD

Embodiments of the invention described herein relate to wireless charging of electronic devices, for example devices that are near-field communications (NFC) capable devices.

BACKGROUND

Wireless charging of an electronic device is a desirable convenience as the requirement to physically connect the device to a wire, dock or other physical component while charging is removed.

Some devices capable of near-field communications, referred to as near-field communication (NFC) tags or radio frequency identification (RFID) tags, can communicate with tag reader and can also be powered using energy extracted from signals received from the reader device. The tag has an antenna that is resonant at a frequency on which communications are transmitted from the reader in order to be able to receive as much energy as possible from the signal. This allows reliable communication as well as the extraction of power needed to operate the tag.

Some NFC or RFID capable devices may also include a battery so that they can operate when they are not being powered by a reader.

SUMMARY OF EMBODIMENTS OF THE INVENTION

According to a first aspect of embodiments of the invention there is provided A near-field communication (NFC) or radio frequency identification (RFID) device comprising an NFC or RFID circuit, an antenna having at least a first terminal, a first rectifier connected to the first terminal of the antenna, a switch between the first rectifier and the NFC or RFID circuit, a voltage detector for detecting a voltage in the device caused by a signal received at the antenna, and a control module for controlling the switch. When the voltage exceeds a threshold magnitude, the control module controls the switch to be in an open state and, after a predetermined time period, determines whether the voltage still exceeds the threshold magnitude and, if the voltage still exceeds the predetermined magnitude, controls the switch to be in the open state.

According to a second aspect of embodiments of the invention, there is provided a method of protecting a near-field communications (NFC) or radio frequency identification (RFID) circuit, the method comprising the steps of rectifying a signal received at a first terminal of an antenna using a first rectifier, detecting that a voltage caused by the signal received at an antenna has exceeded a threshold magnitude, controlling a switch between the first rectifier and the NFC or RFID circuit to be in an open state, after a predetermined time period, determining whether the voltage still exceeds the threshold magnitude, and if the voltage still exceeds the predetermined magnitude, controlling the switch to be in the open state.

Other features, aspects and embodiments of the invention are described herein and in the appended claims.

BRIEF DESCRIPTION OF THE FIGURES

Embodiments of the invention will now be described by way of example only, in which.

DETAILED DESCRIPTION OF EMBODIMENTS OF THE INVENTION

NFC Wireless Charging (NFC WC) could be used to charge NFC or RFID capable devices that also include a battery. An NFC wireless charging device, which may also be an NFC or RFID reader, may transmit a wireless charging signal with a relatively high power, for example 10W. NFC and RFID tags are typically designed to operate at relatively low input powers and low voltages. The large voltages that can be produced in NFC and RFID tags by a charging signal (that is, voltages and power levels significantly higher than that used for communication with the tags) could cause the tags to be damaged or even cause a fire risk. Thus, there is a need to protect NFC and RFID tags and other NFC and RFID devices from negative effects of a wireless charging signal transmitted at NFC/RFID frequencies, for example 13.56 MHz. Specific embodiments described hereinafter refer to NFC tags, but the principles identified herein can equally be applied to RFID tags and the protection thereof. In addition, a charging unit specified in the specific embodiments is a NFC wireless charging unit operating within the frequency range of a NFC or RFID tag (for example, 13.56 MHz) though can be any other type of wireless charging unit or any other source of strong electromagnetic radiation.

Figure 1:
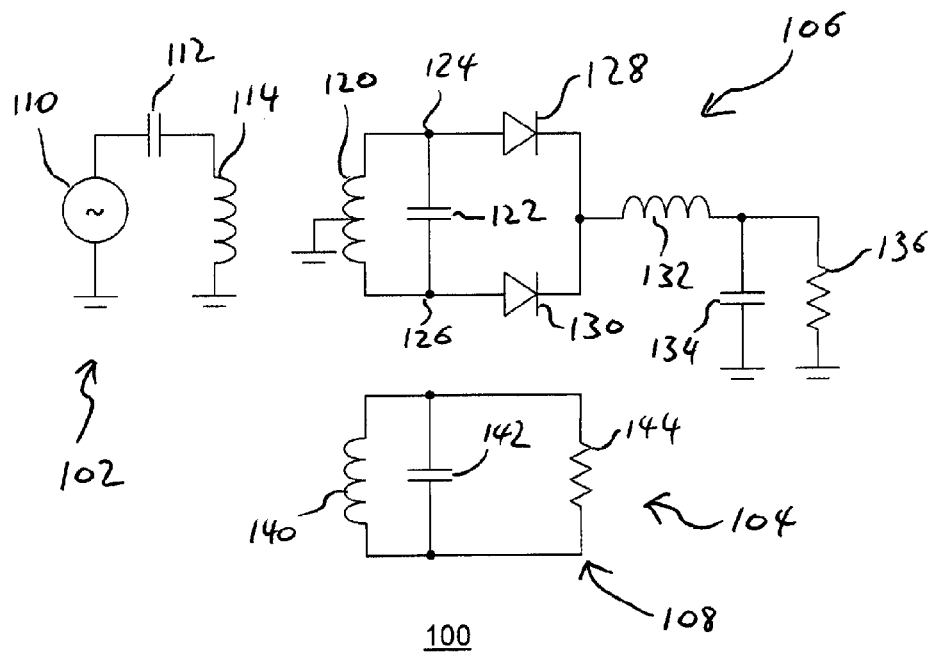
FIG. 1 shows an arrangement of an NFC wireless charging system with two devices within range of the charger.

FIG. 1 shows an example of an NFC wireless charging system comprising an NFC wireless charger 102 and an NFC device 106 capable of being charged by an NFC wireless charging signal. Another NFC device 108 is also in the charging field. The NFC wireless charger 102 includes a signal generator 110 for generating the charging signal, and an antenna comprising a capacitor 112 and inductor 114 connected in series between the signal generator 110 and ground. The NFC wireless charging unit 106 includes an antenna comprising an inductor 120 and capacitor 122 connected between nodes 124 and 126. The nodes 124 and 126 are connected to respective rectifiers 128 and 130 which each comprise a half-wave rectifying diode. The outputs of the diodes are provided to a filter comprising inductor 132 and capacitor 134 connected between the diodes and ground. A resistance 136 representing the load (the battery charging circuit) is connected in parallel with the capacitor 134.

The NFC tag 108 includes an antenna comprising an inductor 140 and a capacitor 142 connected in parallel, and a load 144 (an NFC circuit) connected in parallel with the capacitor 142. The NFC circuit implements required functions of the NFC tag 108 such as communication with an NFC reader and data processing.

When the NFC wireless charging unit 106 is in close proximity to the charger 102, the NFC wireless communications signal can be received by the charging unit and sufficient power extracted therefrom to charge a battery (not shown).

However, because NFC devices tend to be small in size, the tag 108 is also in close proximity to the charger 102. This may cause large voltages to be induced within the tag 108 and hence damage to the tag.

Figure 2:
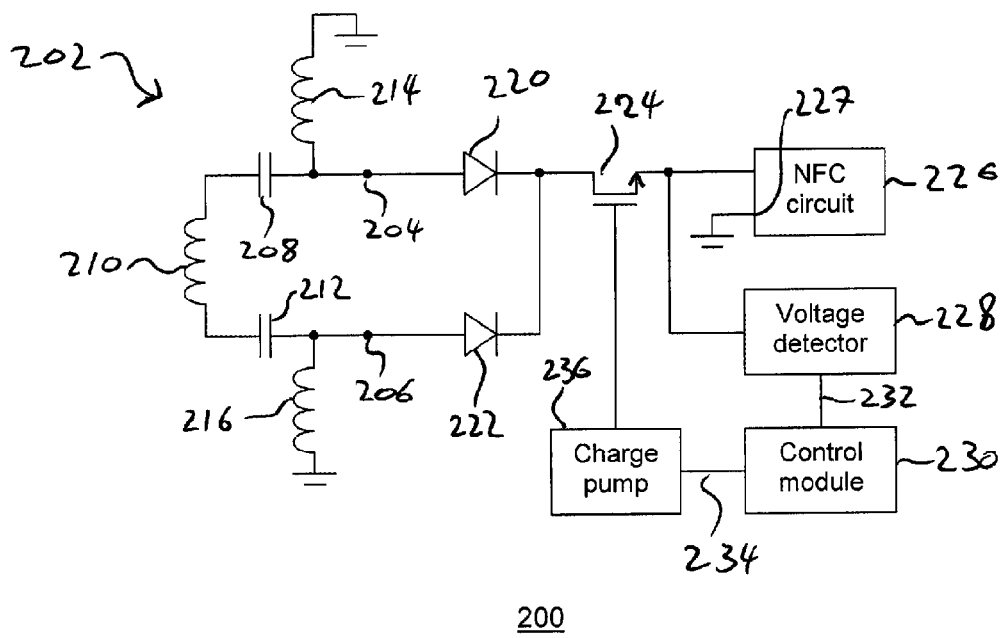
FIG. 2 shows a first example of an NFC device with input level protection.

FIG. 2 shows an example of an NFC tag 200 that may comprise or be included within an NFC device. The tag 200 comprises an antenna 202 having two terminals 204 and 206. The antenna 202 comprises a first capacitor 208, a first inductor 210 and a second capacitor 212 connected in series between the terminals 204 and 206. The antenna 202 further includes a second inductor 214 connected between the first terminal 204 and ground, and a third inductor 216 connected between the second terminal 206 and ground. The antenna 202 is a typical example of an antenna used in NFC devices and its configuration is known to the person skilled in the art. Any alternative antenna having a different configuration may also be used.

The device 200 includes a first rectifier, comprising a first diode 220 connected to the first terminal 204 of the antenna 202 and substantially half-wave rectifies a signal received by the antenna and provided to the first terminal 204. Similarly, a second rectifier comprising a second diode 222 substantially half-wave rectifies a signal received by the antenna and provided to the second terminal 206. The diodes 220 and 222 are examples of rectifiers and other rectifiers may be used in alternative embodiments.

The outputs of the diodes 220 and 222 are connected to the drain of a transistor switch 224. The source of the switch 224 is connected to a near-field communications (NFC) circuit 226. The NFC circuit 226 implements functions of an NFC tag, such as for example communication and data processing. In some embodiments, the NFC circuit is produced as a silicon chip with peak operating input voltages of between <+5 to +10V and >−0.5V to −0.7V and/or is unable to reliably handle large voltages caused by, for example, NFC wireless charging signals. Therefore, the NFC circuit 226 must be protected from such voltages. The NFC circuit may include a terminal for receiving a signal from the switch 224, and may also include a terminal input 227 that is in the embodiment shown in FIG. 2 connected to ground (or some reference voltage). The two terminals of the NFC circuit may otherwise be intended for direct connection to two antenna terminals, and thus embodiments of the invention may in some cases reduce the number of terminals required of the NFC circuit 226. The NFC circuit may also have one or more other input and/or output terminals (not shown) as appropriate.

The source of the switch 224 is also connected to a voltage detector 228. The voltage detector 228 (which may in some embodiments comprise, for example, a comparator, peak detector or any other suitable implementation) monitors the voltage at the drain of the transistor switch 224. If this voltage exceeds a predetermined threshold magnitude (for example, greater than some voltage allowable on the NFC circuit), the voltage detector 228 provides a signal to a control module 230 via a signal line 232 to indicate this fact. The control module 230 controls the transistor switch 224 via a signal line 234 and charge pump 236 to implement protection of the NFC circuit 226 from damaging voltages. The configuration shown assumes an N-type enhancement MOSFET switch. The charge pump allows the voltage from the chip to be increased in value (pumped up) to ensure the external switch's gate voltage is high enough to adequately turn on the switch. Supply voltages on chip may be lower than the voltage required at the switch's gate for turn on.

When receiving an NFC wireless charging signal, intentionally or unintentionally, the input signal 204/206 could swing to either large positive or large negative voltages. The negative voltages if passed to the NFC circuit 226 may have the effect of forward biasing the substrate of the circuit, meaning that large uncontrolled currents could flow and may cause damage to the circuit. Because an NFC data signal is amplitude modulated, the received signal can be full wave rectified without any danger of losing the data content of the signal. If the negative voltages are not removed by the full-wave rectification, then the NMOS switch might not remain switched off during negative transitions of a received signal.

Figure 3:
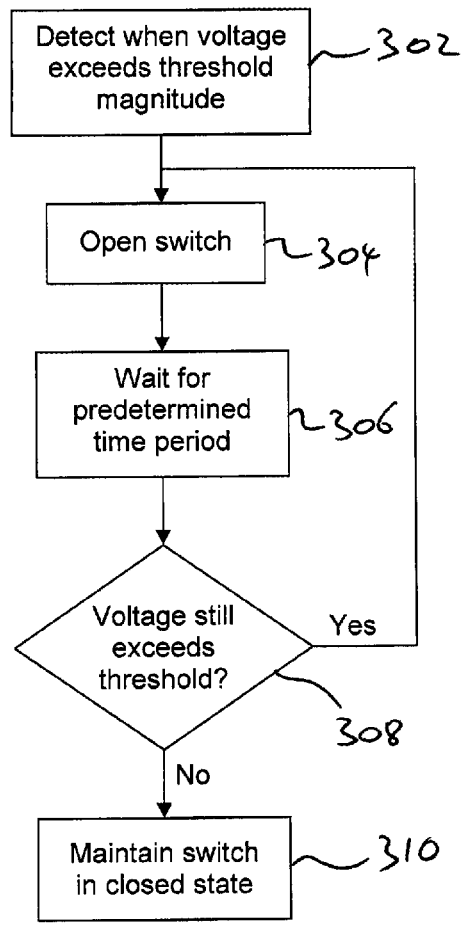
FIG. 3 shows an example of a method of controlling a switch.

FIG. 3 shows an example of a process 300 carried out by the control module 230 for controlling the switch 224 and protecting the NFC circuit 226. In a first step 230, the control module detects that a voltage in the device 200 caused by a signal received at the antenna 202 exceeds a predetermined threshold magnitude. This may be for example receiving a signal to indicate such from the voltage detector 228. In the next step 304, the control module 230 opens the switch 224 by providing an appropriate signal (for example control voltage) to the gate of the switch 224 using signal line 234. This provides a substantially open circuit between the rectifiers 220 and 222 and the NFC circuit 226 and thus ensures that high voltages caused by a signal, such as an NFC wireless charging signal for example, do not reach the NFC circuit 226.

In the next step 306 of the method 300, the control module waits for a predetermined time period while maintaining the switch 224 in an open state. The predetermined time period may be fixed or variable and may be, for example, 250 ms or any other time period. Then, in step 308, the control module determines whether the detected voltage still exceeds the threshold magnitude, or would exceed the magnitude if the switch 224 is closed. If the voltage still exceeds or would exceed the threshold magnitude, the method 300 returns to 304 where, depending on the implementation of step 308, the switch 224 is either returned to the open state or is maintained in the open state. On the other hand, if the voltage does not exceed or would not exceed the threshold magnitude, the method 300 proceeds from step 308 to step 310, where the switch 224 is maintained in a fully closed state, effectively reconnecting the NFC circuit 226 to the rectifiers and allowing the NFC circuit 226 to carry out its functions, for example communicating using the antenna 202. At this point the control loop returns to 302.

In one example implementation of step 308 of the method 300, the control module 230 gradually controls the gate voltage of the switch 224 to gradually transition the switch 224 to the closed state. If at any time during the transition the voltage detected by the voltage detector 228 exceeds the predetermined threshold, this will be indicated to the control module 230 via the signal line 232, and the control module would return to step 304 of the method 300 and fully open the switch 224.

In alternative embodiments, a parasitic capacitance of the switch 224 may be used to monitor a voltage caused by a received signal. For example, the voltage at the source of the switch 224 may be less in an open state than if the switch were in a closed state, but may still provide an indication of what the voltage would be if the switch is in a closed state. Therefore, while the switch is fully open the voltage at the source could be used to determine whether to maintain the switch in an open or closed state. For example, the voltage detector 228 may compare the voltage to a second, lower threshold magnitude and indicate to the control module whether this lower threshold voltage is exceeded. Alternatively, for example, a second voltage detector (not shown) may be used to determine whether the lower threshold voltage is exceeded.

In further alternative embodiments (not shown), the voltage detector 228 may detect the voltage at other circuit points, for example at the source of the switch 224 and the outputs of the rectifiers 220 and 222. In this case the voltage detector may continuously compare the voltage with a single threshold magnitude. The voltage detected by the voltage detector in this case may also be reduced using for example a potential divider to ensure that large, potentially damaging voltages do not reach the voltage detector. The voltage detector may also detect the voltage at any other suitable point within the device 200. In any case, the threshold voltage is chosen to prevent large voltages from reaching the NFC circuit 226 and to allow the NFC circuit to connect to the antenna 202 during normal operation and signal levels lower than a large NFC wireless charging signal.

In some embodiments, hysteresis may be employed when controlling the switch 224. For example, the switch 224 may be opened when a monitored voltage rises above a first level, whereas the switch may be closed when the monitored voltage falls below a second level (or what the monitored voltage would be if the switch were to be closed), wherein the second level is lower than the first level. This may avoid for example rapid opening and closing of the switch 224 when a voltage caused by the received signal is around the level that causes the switch 224 to open.

In some embodiments, the switch 224 may be implemented using any suitable device, such as for example a n-type DMOS (double-diffused metal oxide semiconductor) transistor. In one embodiment, for example, where an NFC communications signal received at the antenna is expected to result in a 2V peak signal from the antenna, the n-type DMOS switch is implemented to receive a gate voltage of 5V or higher. The gate voltage is preferably higher than 2V+Vt, where Vt is the threshold voltage of the switch, to ensure that the channel resistance of the switch is suitably low in the closed state. For discrete power transistors such as the n-type DMOS transistor described as an example herein, the threshold voltage Vt may be as high as 2.5V. In other embodiments, however, any suitable switch may be used, and the switch may even be implemented as multiple devices such as multiple transistors. Additionally or alternatively, the switch may be implemented using a combination of n-type and p-type instead of just n-type transistors. Additionally the switch could be implemented with one or more bipolar transistors.

In the embodiment shown in FIG. 2, the charge pump 236 is used to ensure a high enough gate voltage for the switch 224 when necessary, even if the control module 230 is implemented as a low-power circuit or uses a low voltage power supply. The charge pump 236 therefore increases the level of the signal on the signal line 234 to a suitable level for the gate of the switch 224. For example, a voltage of 1.8V on the signal line 234 may be increased to 5V before being provided to the gate of the switch 224. However, in some embodiments the charge pump 236 can be omitted where the control module 230 is capable of providing a gate voltage to the switch 224 at a suitable level. Other devices can alternatively provide a similar function to the charge pump, such as a level shifting circuit for example.

In some embodiments, the device 200 may be implemented using one or more integrated circuits (ICs). The antenna 202 may or may not reside on one of these ICs. For example, in one implementation, a chip comprising an integrated circuit may implement the NFC circuit 226, voltage detector 228 and control module 232. Such an IC may be produced for example according to a CMOS process using gate-oxides of 7 nm thickness or less. The rectifiers 220 and 222 may be implemented on a second chip or IC, and may be produced for example according to a high or higher voltage process. The two ICs may be mounted separately on a carrier or may be stacked, for example with the IC implementing the rectifiers and switch being mounted on the IC implementing the NFC circuit and other components, and suitable methods, such as bond wires or any other suitable connection methods, may be used for connecting the ICs. Still further, the device 200 (excluding or including the antenna 202) may be produced on a single IC providing both low and high voltage components, or using a process that can provide both low and high voltage devices. Other numbers of integrated circuits, their arrangements and the components they implement are also possible.

The device 200 may continuously monitor a voltage caused by a received signal and open the protective switch when appropriate. Additionally or alternatively, the protection may be applied upon activation of the NFC circuit. For example, the NFC circuit may be switched off, such as by receiving no power, or be in a "sleep mode" or the like. In some embodiments, the switch will remain in an open state, which will ensure that the NFC circuit is protected from large voltages even in a sleep mode or when switched off or receiving no power. The NFC circuit may then be powered on (such as by receiving power from a battery), or may exit the sleep mode, and a gate voltage applied to the switch to cause the switch to be in a closed state. The voltage detector will monitor the voltage caused by a signal received at the antenna, and the control module will open the switch if this voltage rises above the threshold magnitude.

Figure 4:
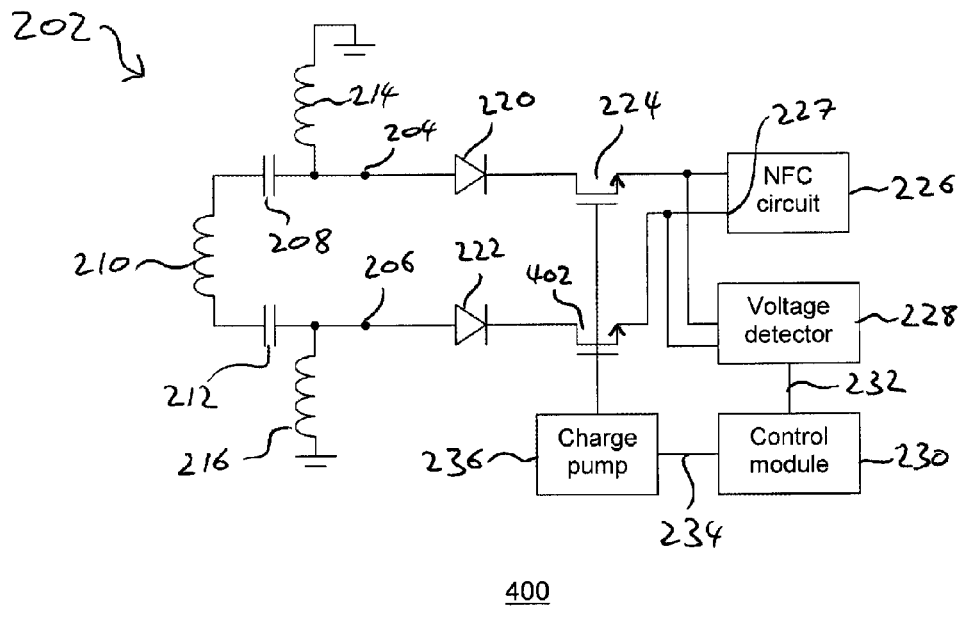
FIG. 4 shows a second example of an NFC device with input level protection.

FIG. 4 shows a further embodiment of an NFC device 400. The device 400 includes many components identical to those shown in FIG. 2, and thus like reference numerals are given to these components. The device 400 is similar to the device 300, except that the output of the second rectifier 222 is provided to the drain of a second switch 402 instead of the switch 224, the source of the second switch 402 is connected to the terminal 227 of the NFC device 226, and the gate of the second switch 402 is connected to the gate of the first switch 224 and the output of the charge pump 230. Operation of the device 400 is similar or identical to that of the device 200. The voltage detector 228 monitors the differential voltage at the sources of the first transistor switch 224 and the second transistor switch 402, but instead could monitor the voltage at the source of the first switch 224 or second switch 402, or at any other suitable point in the circuit as described above with reference to FIG. 2.

Figure 5:
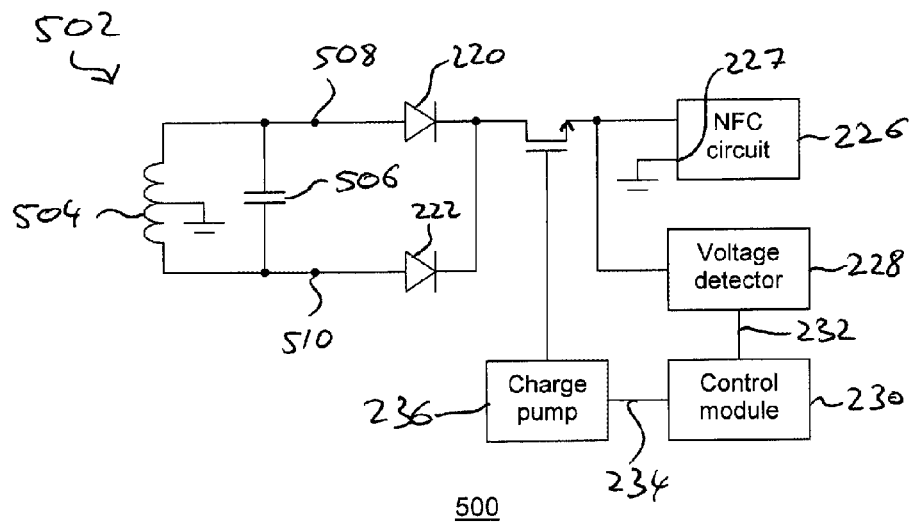
FIG. 5 shows a third example of an NFC device with input level protection.

FIG. 5 shows another embodiment of an NFC device 500, which is identical to the device 200 shown in FIG. 2, except that a different antenna 502 is used. The antenna 502 includes an inductor 504 and a capacitor 506 connected in parallel between antenna terminals 508 and 510. The inductor 504 includes a centre tap connected to ground. The terminals 508 and 510 are connected to the inputs of rectifiers 220 and 222 respectively. Operation of the device 500 is identical to that of the device 200. The antenna 502 may be used in the embodiment of FIG. 4 in place of the antenna 202. In other embodiments, any suitable antenna can be used with any NFC device.

The NFC devices described herein may be used in place of the NFC tag 108 shown in FIG. 1, meaning that an NFC wireless charging unit and an NFC device may coexist in close proximity to each other without the risk of an NFC wireless charging signal damaging the NFC device.

In some embodiments, when a high power NFC wireless charging signal is received at the antenna, a high voltage signal can be produced at the outputs of the rectifiers. Therefore, in some embodiments, this signal may be provided to an NFC wireless charging unit and used by the unit to charge a battery, for example. Therefore, in some embodiments, the wireless charging unit and the NFC device may share a single antenna, reducing the number of antennas compared to an arrangement such as that shown in FIG. 1.

What is claimed is:

1. A near-field communication (NFC) or radio frequency identification (RFID) device, comprising:
   an NFC or RFID circuit;
   an antenna including a first terminal and a second terminal;
   a first rectifier coupled to the first terminal of the antenna;
   a first switch coupled between the first rectifier and the NFC or RFID circuit;
   a second switch coupled between the second terminal and the NFC or RFID circuit;
   a second rectifier coupled to the second terminal of the antenna;
   a voltage detector configured to detect a voltage in the device caused by a signal received at the antenna; and
   a controller, coupled to the first and second switches, and configured to:
      when the voltage exceeds a first threshold magnitude, cause the first switch to be in an open state;
      wait for a first time period;
      after the first time period lapses, determine whether the voltage exceeds a second threshold magnitude that is less than the first threshold magnitude;
      based on the voltage exceeding the second threshold magnitude after the first time period lapses, cause the switch to remain in the open state; and
      based on the voltage not exceeding the second threshold magnitude after the first time period lapses, cause the switch to be in a closed state; and
      control the second switch in the same manner as the first switch.

2. The NFC or RFID device of claim 1, wherein the first switch is coupled between the second terminal and the NFC or RFID circuit.

3. The NFC or RFID device of claim 1, wherein the voltage detector is configured to detect the voltage at a node between the first switch and the NFC or RFID circuit.

4. The NFC or RFID device of claim 3, wherein the controller is configured to determine whether the voltage exceeds the second threshold magnitude by gradually transitioning the first switch to the on state and monitoring the voltage.

5. The NFC or RFID device of claim 1, wherein the voltage detector is configured to detect the voltage at a node between the first rectifier and the first switch.

6. The NFC or RFID device of claim 1, wherein the controller is configured to control a gate voltage of the switch.

7. The NFC or RFID device of claim 6, wherein the controller is configured to control the gate voltage via a charge pump circuit.

8. The NFC or RFID device of claim 1, wherein the controller is further configured to:
   after the first time period lapses, determine that the voltage exceeds the second threshold magnitude and that the switch is in the open state;
   after a further time period, determine that the voltage still exceeds the second threshold magnitude; and
   control the switch to remain in the open state based on the determination that the voltage exceeds the second threshold magnitude.

9. The NFC or RFID device of claim 1, wherein the antenna comprises a first capacitor, a first inductor, and a second capacitor coupled in series between the first terminal and a second terminal.

10. The NFC or RFID device of claim 9, wherein the antenna further comprises:
    a second inductor connected between the first terminal and ground; and
    a third inductor connected between the second terminal and ground.

11. The NFC or RFID device of claim 1, wherein the antenna comprises an inductor and a capacitor connected in parallel, and wherein a centre tap of the inductor is connected to ground.

12. The NFC or RFID device of claim 1, wherein the first rectifier comprises a first diode.

13. The NFC or RFID device of claim 1, wherein the second rectifier comprises a second diode.

14. The NFC or RFID device of claim 1, wherein the controller is further configured to:
    after the first time period lapses, determine that the voltage still exceeds the second threshold magnitude; and
    control the switch to remain in the open state based on the determination that the voltage still exceeds the second threshold magnitude.

15. A method of protecting a near-field communications (NFC) or radio frequency identification (RFID) circuit, the method comprising the steps of:
    rectifying a signal received at a first terminal of an antenna using a first rectifier;
    detecting that a voltage caused by the signal received at the antenna has exceeded a first threshold magnitude;
    controlling a first switch coupled between the first rectifier and the NFC or RFID circuit to be in an open state;
    waiting for a first time period;
    after the first time period lapses, determining whether the voltage exceeds a second threshold magnitude that is less than the first threshold magnitude;
    based on the voltage exceeding the second threshold magnitude after the first time period lapses, controlling the first switch to remain in the open state;
    based on the voltage not exceeding the second threshold magnitude after the first time period lapses, cause the switch to be in a closed state;
    rectifying the signal received at a second terminal of the antenna using a second rectifier; and
    controlling a second switch coupled between the second rectifier and the NFC or RFID circuit in the same manner as the first switch.

16. The method of claim 15, further comprising:
    after the first time period lapses, determining that the voltage no longer exceeds the second threshold magnitude; and
    controlling the first switch to be in a closed state based on the determination that the voltage no longer exceeds the second threshold magnitude.

17. The method of claim 15, further comprising:
    after the first time period lapses, determining that the voltage still exceeds the second threshold magnitude and that the first switch is in the open state;
    after a further time period, determining that the voltage still exceeds the second threshold magnitude; and
    controlling the first switch to remain in the open state based on the determination that the voltage still exceeds the second threshold magnitude.

18. The method of claim 15, wherein determining whether the voltage exceeds the second threshold magnitude comprises gradually transitioning the first switch to the on state and monitoring the voltage.

* * * * *